(12) United States Patent
Presi et al.

(10) Patent No.: US 8,620,159 B2
(45) Date of Patent: Dec. 31, 2013

(54) MODULATION IN AN OPTICAL NETWORK

(75) Inventors: Marco Presi, Pisa (IT); Ernesto Ciaramella, Rome (IT); Fabio Cavaliere, Vecchiano (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 184 days.

(21) Appl. No.: 13/058,924

(22) PCT Filed: Oct. 7, 2008

(86) PCT No.: PCT/EP2008/063367
§ 371 (c)(1),
(2), (4) Date: Jul. 26, 2011

(87) PCT Pub. No.: WO2010/020295
PCT Pub. Date: Feb. 25, 2010

(65) Prior Publication Data
US 2011/0274433 A1 Nov. 10, 2011

(30) Foreign Application Priority Data

Aug. 19, 2008 (EP) .................................... 08162610

(51) Int. Cl.
*H04J 14/00* (2006.01)
(52) U.S. Cl.
USPC .............. 398/72; 398/67; 398/71; 398/76; 398/115; 398/100; 398/135
(58) Field of Classification Search
USPC .......... 398/66, 67, 68, 69, 70, 71, 72, 98, 99, 398/100, 168, 79, 158, 159, 135, 136, 183, 398/76, 115, 97
See application file for complete search history.

(56) References Cited

U.S. PATENT DOCUMENTS

| 5,559,624 | A | * | 9/1996 | Darcie et al. ................ 398/72 |
| 5,790,287 | A | | 8/1998 | Darcie |
| 2007/0183788 | A1 | * | 8/2007 | Kim et al. ................ 398/160 |
| 2008/0187314 | A1 | | 8/2008 | Chung et al. |

OTHER PUBLICATIONS

International Search Report for PCT/EP2008/063367, mailed Apr. 7, 2009.
Written Opinion for PCT/EP2008/063367, mailed Apr. 7, 2009.
Jeung-Mo Kang et al., "A Novel Hybrid WDM/SCM-PON Using Reflective Semiconductor Optical Amplifier", Microwave Photonics, 2005. MWP 2005. International Topical Meeting on Seoul, Korea Oct. 12-14, 2005, Piscataway, NJ, USA, IEEE, pp. 181-184, XP010890804.

* cited by examiner

*Primary Examiner* — Hanh Phan
(74) *Attorney, Agent, or Firm* — Nixon & Vanderhye P.C.

(57) ABSTRACT

The invention relates to improvements in or relating to modulation in an Optical Network, and to an apparatus, a method and a communications network for modulation in an Optical Network. An apparatus is arranged to receive a modulated optical signal comprising a carrier wavelength and first data. The apparatus is arranged to substantially erase the first data from the optical signal by performing an inversion operation on the modulated optical signal. The apparatus is arranged to receive second data and to modulate the carrier wavelength with the second data for onward transmission of the second data. The inversion operation comprises applying a signal comprising an inverse of the first data to at least a portion of the modulated optical signal. The signal may further comprise the second data such that the modulation of the carrier wavelength and erasure of the first data is performed in a single operation.

18 Claims, 4 Drawing Sheets

MODULATION IN AN OPTICAL NETWORK

This application is the U.S. national phase of International Application No. PCT/EP20081063367, filed 7 Oct. 2008 which designated the U.S. and claims priority to European Application No. 08162610.3, filed 19 Aug. 2008, the entire contents of each of which are hereby incorporated by reference.

TECHNICAL FIELD

The invention relates to improvements in or relating to modulation in an optical network, and in particular to an apparatus, a method and a communications network for modulation in an optical network.

BACKGROUND

It is known to provide a Passive Optical Network that allows a single optical fibre to serve multiple end users. Such a PON is attractive because of the low installation and maintenance costs, whilst allowing the demand for new communications bandwidth services to be met. Such a PON is considered to be passive because it utilises unpowered optical splitters which enable a single optical fibre to send data to multiple users in a downstream direction. Accordingly no active elements are required between a Central Office (CO) node and the customer premises to transmit data in the downstream direction. For these reasons PONs and 10G PONs have experienced significant growth in recent years, and the trend for broadband access networks based on optic fibre is set to continue.

It is also known to provide a Wavelength Division Multiplexing PON (WDM-PON) which uses multiple optical wavelengths to increase the upstream and/or downstream bandwidth. The multiple wavelengths of the WDM-PON can be used by separate Optical Network Units (ONUs) to create several virtual PONs which co-exist on the same physical infrastructure. A problem associated with existing PONs and WDM-PONs is that active optical components, such as lasers, are often required at the user location so that user data can be transmitted in an upstream direction.

It is known from "A Novel Hybrid WDM/SCM-PON Sharing Wavelength for Up- and Down-Link Using Reflective Semiconductor Optical Amplifier", IEEE Photonics Technology Letter, Vol 18, No 3, 1 Feb. 2006, to remodulate a downstream base-band signal as a Sub-Carrier Multiplexed (SCM) optical signal for upstream transmission. This allows the downstream and upstream signals to occupy different regions of the available spectrum. The WDM/SCM-PON achieves this by splitting the downstream base-band signal into two portions at an ONU. One of the portions is passed to a photodiode for onward transmission to the user. The other portion is passed to a Reflective Semiconductor Optical Amplifier (RSOA) where it is remodulated as a SCM signal with data from the users by using a local oscillator and operating the RSOA in a gain saturation region.

A problem associated with the WDM/SCM-PON arrangement is that a complex assortment of optical and electronic components are required at the ONU to allow the RSOA to sufficiently erase the data from the downstream base-band optical signal, to transform the upstream signal into a different region of the spectrum, and to pass the downstream data to the users. Typically the known WDM/SCM-PON requires a local oscillator at the ONU for the upstream signal, and an electrical demodulator at the ONU for the downstream signal. Overall the WDM/SCN-PON is complex and requires additional components which increases costs.

When SCM is used in the upstream direction the Radio Frequency (RF) subcarriers need to be optically modulated at the ONU using an additional Continuous Wave (CW) lightsource such as a laser. Accordingly such SCM arrangements are less desirable for transmission of data in the upstream direction due to the additional stage of RF-to-optical conversion at the ONU.

SUMMARY

An object of the invention is to provide a way of improving modulation in an optical communication network whilst reducing or minimising the above-mentioned problems.

According to a first aspect of the invention there is provided an apparatus arranged to receive a modulated optical signal comprising a carrier wavelength and first data. The apparatus is arranged to substantially erase the first data from the optical signal by performing an inversion operation on the modulated optical signal. The apparatus is arranged to receive second data and to modulate the carrier wavelength with the second data for onward transmission of the second data. The inversion operation comprises applying a signal comprising an inverse of the first data to at least a portion of the modulated optical signal.

Such an apparatus avoids the need for a complex arrangement of optical and electrical components, such as a laser operating as a local oscillator, or a demodulator to demodulate the downstream signal to pass data to users. Such a reduced complexity reduces the costs of implementing and maintaining the apparatus. Performing the inversion operation acts to cancel the first data so that the carrier wavelength can be reused for transmission of the second data.

Such an apparatus also provides the advantage of being able to be used efficiently with a Wireless Fidelity (WiFi) network to connect users via radio in the last mile of an access network. Such a WiFi network is advantageous where a pure optical technology may not be possible or cost effective, for example, when it is difficult to deploy new optic fibre due to the site topology or the expense of excavation to lay new optic fibre. This may be the case for a communications provider operating in a city to supply services to many houses, or in a rural area to supply services to a few houses. The apparatus allows the modulated optical signal to comprise a radio frequency signal that may be passed directly to users via a Radio Frequency transceiver compliant with a WiFi standard.

Preferably the apparatus is arranged to erase the first data and to modulate the carrier wavelength with the second data in a single operation. Preferably the signal further comprises the second data such that the modulation of the carrier wavelength and erasure of the first data is performed in a single operation.

Preferably the signal includes a copy of the received modulated optical signal. Preferably the copy of the received modulated optical signal is an inverted copy of the received modulated optical signal.

Preferably the apparatus is further arranged to substantially synchronise the copy and the received modulated optical signal by delaying one of the copy and the received modulated optical signal relative to the other of the copy and the received modulated optical signal. Delaying of the copy or the received modulated optical signal may depend on the particular arrangement of the apparatus.

The apparatus may further include an optical-to-electrical convertor to receive the copy of received modulated optical signal and to convert it to an electrical signal. The apparatus may be further arranged to invert the copy in the electrical domain. The apparatus may be further arranged to delay the copy or the received modulated optical signal in the electrical domain. Such inverting and delaying in the electrical domain provides a convenient way to manipulate the received modulated optical signal.

Preferably the apparatus further includes an optical amplifier arranged to receive the modulated optical signal. Preferably the optical amplifier is a reflective semiconductor optical amplifier. Preferably the optical amplifier is operable to apply the signal comprising an inverse of the first data to said at least a portion of the modulated optical signal to substantially erase the first data from the optical signal.

Preferably the modulated optical signal is a phase modulated optical signal. Preferably the modulated optical signal is modulated at a radio frequency.

According to a second aspect of the invention there is provided a method of providing communications services. The method includes receiving a modulated optical signal comprising a carrier wavelength and first data, and substantially erasing the first data from the optical signal by performing an inversion operation on the modulated optical signal. The method includes receiving second data, and modulating the carrier wavelength with the second data for onward transmission of the second data. The inversion operation comprises applying a signal comprising an inverse of the first data to at least a portion of the modulated optical signal.

Such a method avoids the need for a complex arrangement of optical and electrical components, such as a laser operating as a local oscillator, or a demodulator to remodulate the downstream signal to pass data to users. Such a reduced complexity reduces the costs of implementing and maintaining the apparatus. Performing the inversion operation acts to cancel the first data so that the carrier wavelength can be reused for transmission of the second data.

Preferably the method includes performing erasing of the first data and modulation of the carrier wavelength with the second data in a single operation. Preferably the method further includes generating the signal by combining the second data and said inverse of the first data.

Preferably the signal includes a copy of the received modulated optical signal. Preferably the copy of the received modulated optical signal is an inverted copy of the received modulated optical signal.

Preferably the method further includes substantially synchronising the copy and the received modulated optical signal by delaying one of the copy and the received modulated optical signal relative to the other of the copy and the received modulated optical signal.

Preferably the modulated optical signal is a phase modulated optical signal. Preferably the modulated optical signal is modulated at a radio frequency.

According to a third aspect there is provided a communications network including an apparatus according to the first aspect, or arranged to perform a method according to the second aspect.

It will be appreciated that any preferred or optional features of one aspect of the invention may also be preferred or optional feature of other aspects of the invention.

BRIEF DESCRIPTION OF THE DRAWINGS

Other features of the invention will be apparent from the following description of preferred embodiments shown by way of example only with reference to the accompanying drawings, in which.

DETAILED DESCRIPTION

Figure 1:
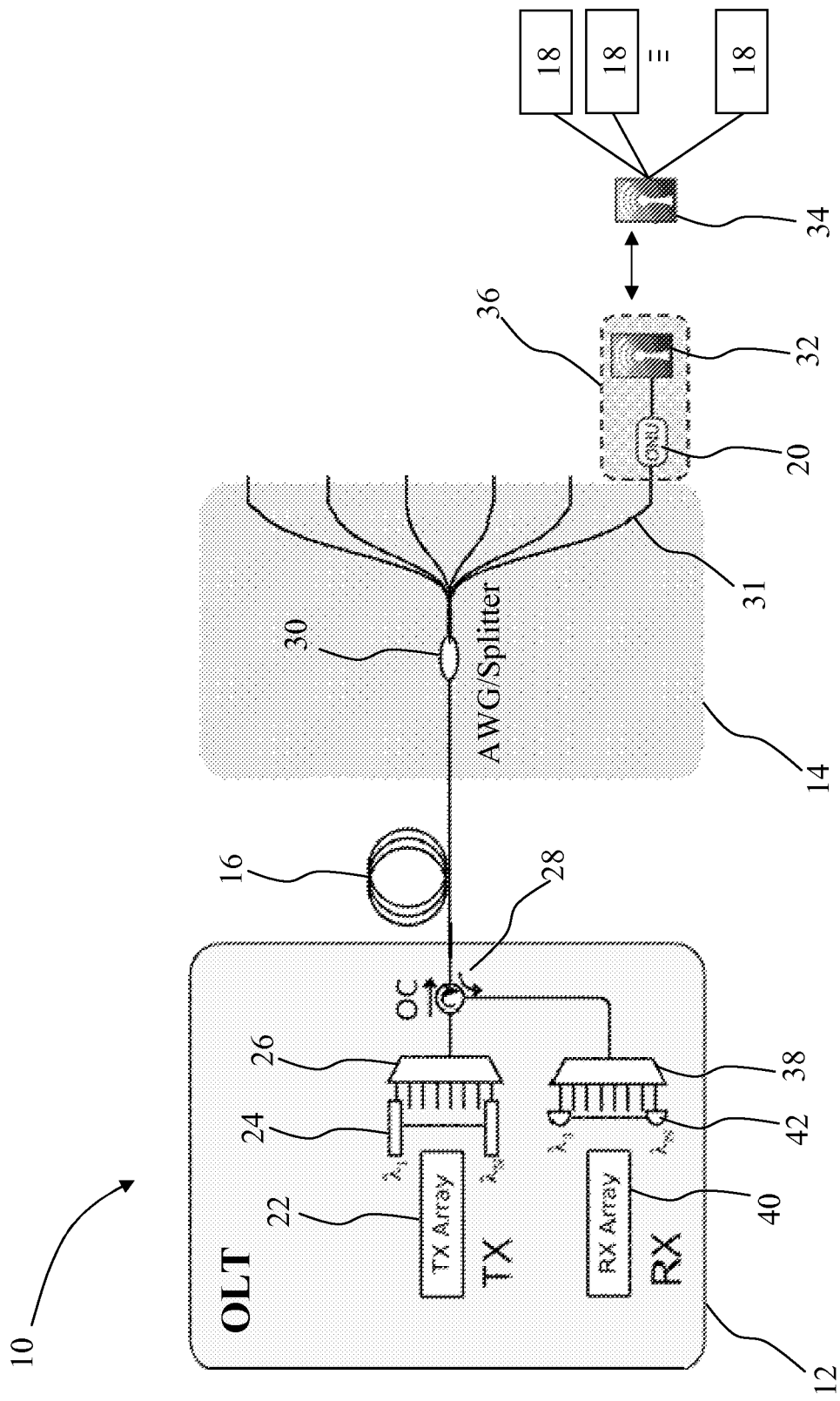
FIG. 1 shows a schematic diagram of an optical network according to an embodiment of the invention.
Figure 2:
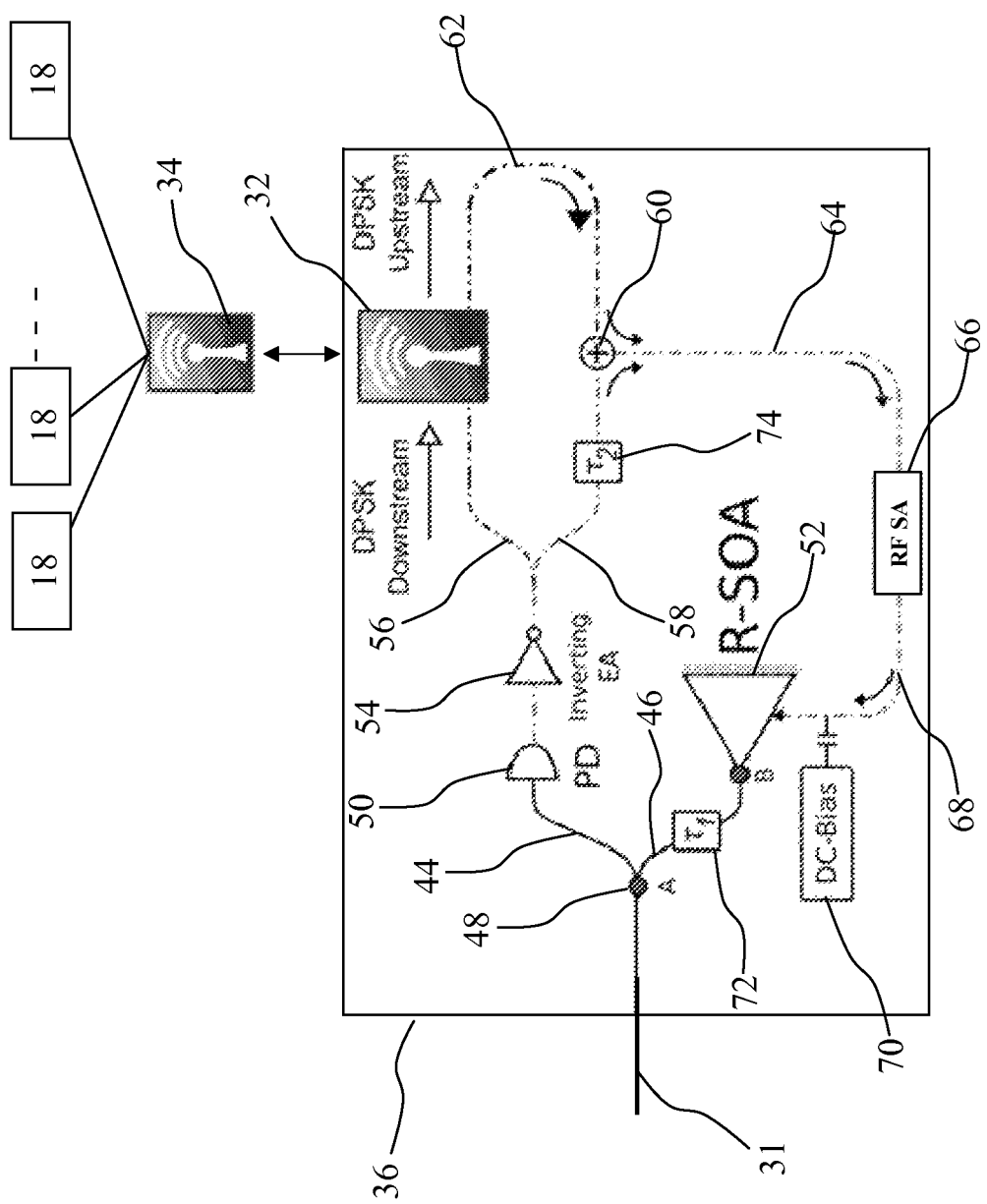
FIG. 2 shows a schematic diagram of an Optical Network Unit and transceiver arrangement shown in FIG. 1.

FIG. 1 shows a schematic diagram of an optical network according to an embodiment of the invention, generally designated 10. The network 10 comprises a Central Office (CO) node 12, also known as an Optical Line Termination (OLT) node, in communication with a Wavelength Division Multiplexing (WDM) distribution node 14 via a single optical fibre 16. The single optical fibre 16 permits the upstream and downstream signals to share the same fibre and thereby maximize the system efficiency whilst keeping costs to a minimum. The WDM distribution node 14 is in communication with a plurality of user devices 18 via an Optical Network Unit (ONU) 20. FIG. 1 has been simplified for the purposes of clarity to show one ONU 20 but it will be appreciated that in the real world example, there may be N such ONUs 20 where each ONU 20 serves a plurality of user devices 18. In this embodiment N is typically sixty four. In FIGS. 1 and 2 optical connections are represented with solid lines, whereas electrical connections are shown with dotted lines.

In FIG. 1 the CO node 12 comprises a WDM transmitter array 22 capable of producing N channels having Differential Phase Shift Keyed (DPSK) pulse trains using N lasers 24 operating at different wavelengths. The pulse trains are modulated at 155 Mb/s over a sub-carrier at 2.4 GHz, for example, according to a WiFi standard such as IEEE 802.11a, 802.11b, 802.11g or 802.3. Such standards do not define a maximum number of user devices 18 but in general up to thirty four user devices 18 may be used with the arrangement of FIG. 1. The outputs of the N lasers 24 are combined by an optical WDM filter 26 such as an Array Wave Guide (AWG) filter operating as a multiplexer. The multiplexed channels at different wavelengths are then passed to an optical circulator 28 and then transmitted through the optic fibre 16 to the WDM distribution node 14. At the WDM distribution node 14 the channels 1 to N are passively separated by means of a second WDM filter 30, such as an AWG operating as a demultiplexer. Each channel 1 to N is then passed to a respective ONU 20 via respective optical fibres 31. The data contained in the channel passed to the ONU 20 is then passed to user devices 18 via RF transceivers 32, 34 compliant with the WiFi standard for onward transmission to users. The transceiver 32 is able to transmit the data to the transceiver 34 because the optical signal is already at a Radio Frequency (RF) so there is no need of frequency conversion.

In the upstream direction user data is transmitted as a RF signal, for example a WiFi signal, from the transceiver 34 to the transceiver 32 and then passed to the ONU 20. Remodulating of the downstream signal is then performed at the ONU 20 to transmit the user data in the upstream direction. The arrangement of the ONU 20 and the transceiver 32, shown at 36, to perform the upstream remodulation is described with reference to FIG. 2. In FIG. 1 the upstream optical signals from each ONU 20 are passed to the filter 30 via the respective optical fibres 31. The filter 30 operates as a multiplexer in the upstream direction and passes the multiplexed upstream signals to the CO node 12 via the optic fibre 16. At the CO node 12 the multiplexed upstream signals are received by the optical circulator 28 which passes them on to a third optical filter 38, for example an AWG, which operates as a demultiplexer. Each channel is then separated by a receiver array 40 which has respective optical receivers 42 for each channel. The N different channels are then further transmitted in the upstream direction as required.

FIG. 2 shows a schematic diagram of an Optical Network Unit and transceiver arrangement shown in FIG. 1. Like features to the arrangement of FIG. 1 are shown with like reference numerals. FIG. 2 shows an optical splitter 48 that is operable to split the downstream optical fibre 31 into a first branch 44 and a second branch 46, both branches 44, 46 containing the downstream modulated optical signal. The first branch 44 is connected to a photodetector 50, and the second branch 46 is connected to a Reflective Semiconductor Optical Amplifier (RSOA) 52. The optical splitter 48 may be an asymmetrical optical splitter with a smaller portion of the optical power being passed to the RSOA 52 because only a fraction of the downstream signal is required for remodulated by the upstream signal. Passing a smaller portion to the RSOA 52 also provides the advantage of minimising cross-talk in the optic fibre 31 between the two DPSK signals in the downstream and upstream directions.

The photodetector 50 converts the optical signal into an electrical signal which is then passed to an inverting electrical amplifier 54 which acts to amplify and invert the electrical signal. By inverting it is meant multiplying the input signal by −1. The inverting electrical amplifier 54 provides the power needed for the wireless transmission and it is noted that the inverting process does not affect the DPSK coding. The inverted electrical signal is then split into a third branch 56 and a fourth branch 58, each branch 56, 58 containing the same inverted electrical signal. The third branch 56 is connected to the transceiver 32 which transmits the data signal to the transceiver 34 which subsequently passes the appropriate parts of the data signal to respective user devices 18. The fourth branch 58 is passed to a signal combiner 60 which may be an analogue device operable to combine the fourth branch 58 with user data in an upstream branch 62 from the user devices 18. The signal combiner 60 outputs to a fifth branch 64. The fifth branch 64 comprising the inverted downstream signal from the fourth branch 58, and the user data from the user devices 18, is then passed to a RF signal amplifier 66. The RF signal amplifier 66 then couples the resulting amplified RF signal at 68 to the RSOA 52 by means of a DC-bias device 70 which drives the RSOA 52.

FIG. 2 shows that there are two possible paths between the points A and B. The first path is from the optical splitter 48 to the RSOA 52 in the optical domain. The second path is from the optical splitter 48 to the photodetector 50, and then to the RSOA 52 via the inverting electrical amplifier 54, the signal combiner 60, and the RF signal amplifier 66. For the RSOA 52 to operate correctly the data signals in the first and second paths are required to be substantially synchronised. This is achieved by an optical delay device 72 in the first path to implement a delay τ1, and an electrical delay device 74 in the second path to implement a delay τ2. The second path is likely to be slower than the first path because it comprises a substantial part in the electrical domain. For this reason the optical delay device 72 is most likely to be employed to delay the signal in the first path. The delay τ1 and τ2 may be of the order of a few picoseconds.

It will be appreciated that the actual delay device used may depend on the overall design of the optical and electrical circuitry. The delay τ1 in the first path and the delay τ2 in the second path are adjusted so that the two paths between the points A and B have the same trip time. The inverted and the delayed signal in the second path substantially cancels out the signal in the first path when the two signals are combined at the RSOA 52. In other words, the signals of the first path and the second path should coincide. Such a condition can be conveniently fixed at the design stage as required. This arrangement produces a Continuous Wave (CW) optical carrier that can be remodulated with the upstream signal 62 from the user devices 18, but without the need for a dedicated laser. It will be appreciated that this constraint does not imply any synchronization between the downlink signal and the uplink signal from the RSOA 52.

Whereas the RSOA 52 is capable of receiving the downstream optical data signal and combining it with the inverted and delayed copy of the downstream signal, it will be appreciated that any optical device could be used in place of the RSOA that achieves this result. The advantage of using the RSOA 52 in this manner is that there is no need for a radio-frequency conversion stage, or a separate optical Continuous Wave (CW) light source, such as a laser, for transmission in the upstream direction.

It will be appreciated that the optical data in the downstream optical signal is substantially or partially erased so that it is possible to write new data to the carrier wavelength whereby any remaining parts of the old optical data do not substantially interfere with the new optical data. Whereas the optical data in the downstream optical signal is mostly erased, it will be appreciated that if it is not fully erased the network 10 may still function correctly to transmit user data in the upstream direction. It has been discovered that in order to obtain a good erasing property of the downstream optical signal the first path and the second path between A and B in FIG. 2 should be substantially synchronised. The network 10 may tolerate a certain amount of difference in the trip time between the first and second paths, for example, up to 10%, or up to 20% with a corresponding reduced network performance.

It will also be appreciated that variable amplifiers may be required in the first path or the second path to provide substantially equal amplitudes of the downstream signal input to the RSOA 52 and the inverted copy of the downstream signal input to the RSOA 52. Such substantially equal amplitudes are necessary to provide a sufficient erasing property of the RSOA 52, but a degree of tolerance such as 10% difference may be accommodated, or 20% difference with a corresponding reduced network performance.

Equations describing the behaviour of the network 10 are provided below. Firstly a DPSK signal r(t) transmitted by a RF subcarrier from the CO node 12 is described in equation (1):

$$r(t) = \sum_k \cos(\omega_{RF} t + \phi_k) = \sum_k d_k(t) \quad (1)$$

Where $\omega_{RF}$ is the radio frequency, $\Phi_k$ can assume the values $\pm\pi$ in each term and $d_k$ represent the term sequence.

After electrical to optical conversion at the CO node 12, the optical signal can be then written as equation (2):

$$s_{out}(t) = \left[1 + m \sum_k d_k(t)\right] e^{i\omega_0 t} \quad (2)$$

Where $\omega_0$ represents the frequency of the optical carrier, which may be 193 THz for a wavelength of 1500 nm, and m indicates the modulation depth.

The downstream optical signal entering the RSOA 52 is modified according to equation (3):

$$s_{out}(t)=g(t)s_{in}(t) \quad (3)$$

Where g(t) is the gain provided by the RSOA 52. The inversion operation uses g(t) such that it erases the modulation of the optical input signal. By setting g(t) as the inverse copy of $d_k$, equation (4) is obtained:

$$s_{out}(t) = \left[1 - m\sum_k d_k(t)\right]s_{in}(t) = \left[1 + m^2\sum_k d_k^2(t)\right] \quad (4)$$

The term $d_k^2(t)$ oscillates at a frequency equal to $2\omega_{RF}$. When m<1 such that the optical signal is modulated with a low modulation index, the terms at $d_k^2(t)$ have a reduced amplitude. Furthermore, if the respective optical receivers 42 at the CO node 12 have a limited bandwidth i.e. <$2\omega_{RF}$, the $d_k^2(t)$ terms are filtered out.

When the upstream signal 62 from the transceiver 32 is added to the inverted copy of the signal, the complete remodulated signal output from the RSOA 52 is given by equation (5):

$$s_{out}(t) = \left[1 - m\sum_k d_k(t) + M\sum_k D_k(t)\right]s_{in}(t) \quad (5)$$
$$= \left[1 + M\sum_k D_k(t) - m^2\sum_k d_k^2(t) + mM\sum_k d_k D_k\right]$$

In equation (5) an additional term $2\omega_{RF}$ arises in addition to the upstream modulated signal $$M\sum_k D_k(t)$$

(where M is the upstream modulation depth and $D_k(t)$ represent uplink data). The additional term is again filtered out at the optical receivers 42.

Figure 3:
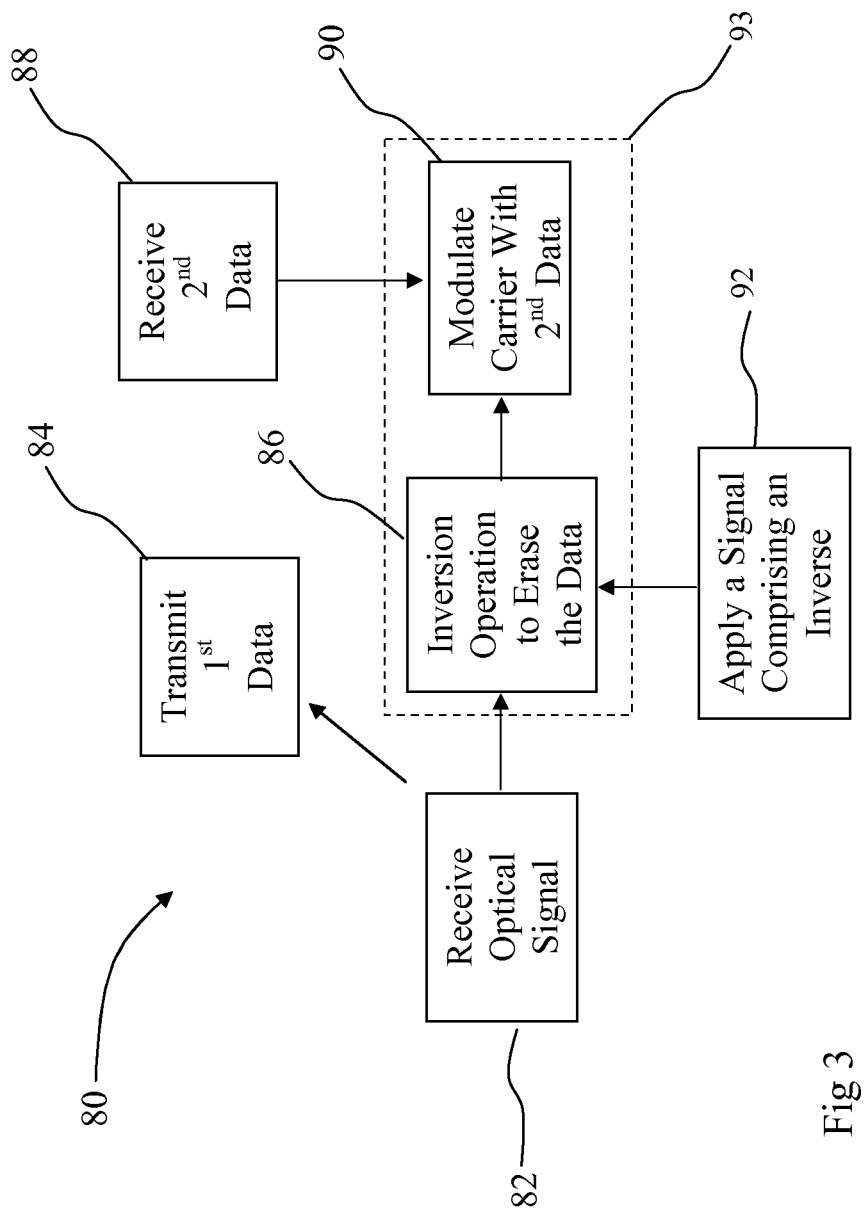
FIG. 3 a flow diagram illustrating a method according to an embodiment of the invention.

FIG. 3 shows a flow diagram illustrating a method according to an embodiment of the invention, generally designated 80. The method relates to the operation of a communications network for providing communications services to at least one user. The method includes receiving 82 a modulated optical signal comprising a carrier wavelength and first data. The method may include transmitting 84 the first data to at least one user device. The method further includes applying an inversion operation to substantially erase the data 86 from the modulated optical signal. The method further includes receiving second data 88, and modulating 90 the carrier wavelength with the second data for onward transmission of the second data. The inversion operation comprises applying a signal comprising an inverse of the first data to at least a portion of the modulated optical signal 92. The method is preferably arranged such that the inversion operation to substantially erase the data 86 from the modulated optical signal, and the modulating of the carrier wavelength with the second data 90 are performed in a single step indicated at 93 e.g. due to the applied signal comprising the second data, as well as an inverse of the first data.

Figure 4:
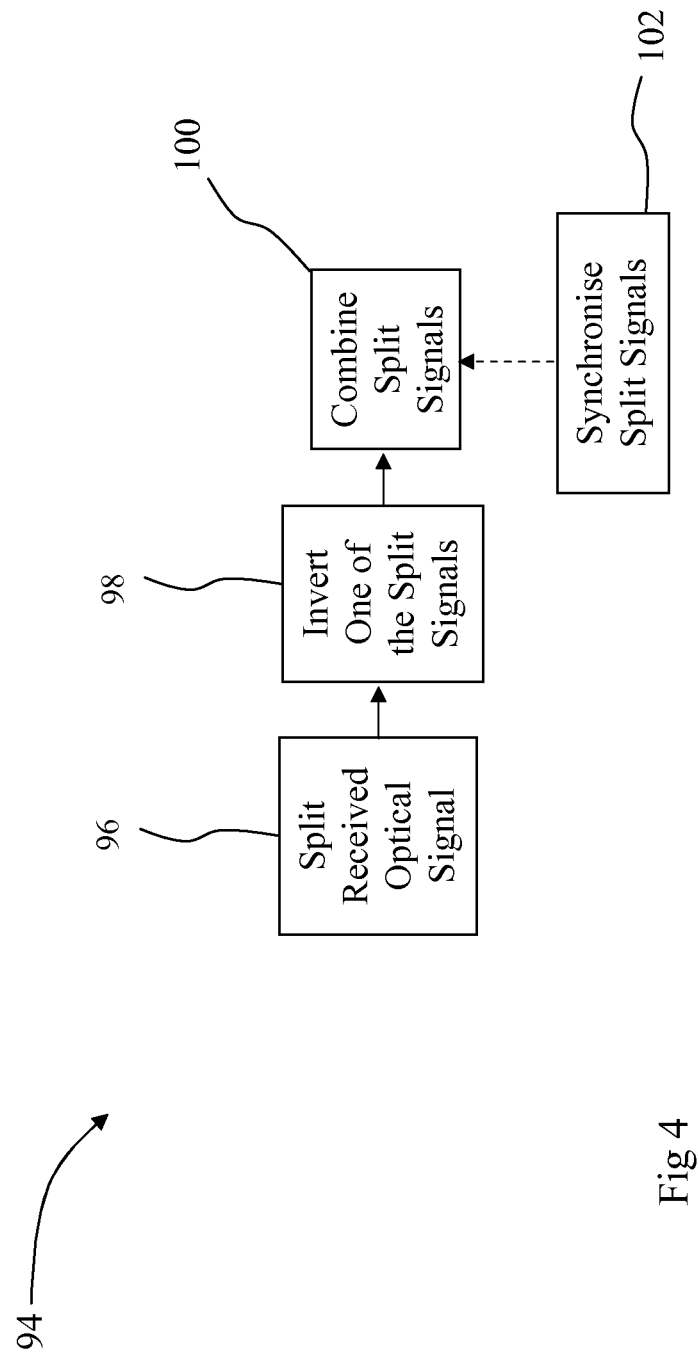
FIG. 4 is a flow diagram illustrating an inversion operation of FIG. 3.

FIG. 4 shows a flow diagram illustrating an inversion operation of FIG. 3, generally designated 94. In FIG. 4 the inversion operation includes splitting 96 the received modulated optical signal into at least a first portion and a second portion. The method further comprises inverting 98 one of the first portion or the second portion (or at least a copy thereof), and then combining 100 the inverted portion/copy and the other portion to perform the erasing of the first data. The method may further include substantially synchronising 102 the two portions for re-recombination by delaying one of the first portion or the second portion. The steps described with reference to FIG. 4 provide a suitable inversion operation for erasing the data from the downstream optical signal.

The above embodiments describe a bidirectional and dispersion tolerant 2.5 Gb/s WDM-PON based on a DPSK remodulation format. The WDM-PON can be operated in a symmetric manner such that the downstream data rate may be equal to the upstream data rate for a respective user. The proposed optical to wireless interface provides a colourless ONU 12 that can be used with any wavelength. Whereas DPSK has been described it will be appreciated that the embodiments may be used with any kind of Phase Shift Keying (PSK) such as Binary Phase Shift Keying (BPSK), Quadrature Phase Shift Keying (QPSK), Differential Quadrature Phase Shift Keying (DQPSK) etc.

The RSOA 52 at the ONU 20 operates as a downstream modulation eraser, an upstream amplifier, and an upstream modulator which provides a reduction of the cost and complexity of the ONU 20 whilst avoiding the need for overly complex active optical devices. Since the RSOA 52 operates as an amplifier, the power of the optical signal transmitted in the downstream direction can be reduced, hence reducing the overall link power.

The above described embodiments provide the advantage of avoiding the need for a complex arrangement of optical and electrical components at the ONU 20, such as a laser or a local oscillator for the upstream signal, or a demodulator for the downstream signal to pass the data to users. Such a reduced complexity reduces the costs of implementing and maintaining the network 10. Performing the inversion operation is a convenient way to cancel the downstream data so that the carrier wavelength can be reused for transmission of data in the upstream direction. The embodiments allow the same subcarrier to be used on the same wavelength for both the upstream and downstream signals. This provides the further advantage that a baseband spectral region remains unoccupied in the network 10, and may be used for digital transmission.

Such an apparatus also provides the advantage of being able to be used efficiently with a WiFi network to connect users via radio in the last mile of an access network. Such a Wi-Fi network 10 described above uses radio technology described in IEEE 802.11a, 802.11b or 802.11g to provide secure, reliable, and fast connectivity. The above embodiments describe a way of interfacing an optical network to a Wi-Fi network using the 2.4 GHz or 5 GHz radio bands whilst minimizing the hardware required for optical to wireless signal format conversion.

Such a WiFi network is advantageous where a pure optical technology may not be possible or cost effective, for example, when it is difficult to deploy new optic fibre due to the site topology or the expense of excavation to lay new optic fibre. This may be the case for a communications provider operating in a city to supply services to many houses, or in a rural area to supply services to a few houses. The apparatus allows the downstream modulated optical signal to comprise a radio frequency signal that may be passed directly to users via a WiFi signal.

The invention claimed is:

1. An apparatus arranged to receive a modulated optical signal modulated at a radio frequency and comprising a carrier wavelength and first data, the apparatus arranged to substantially erase the first data from the optical signal by performing an inversion operation on the modulated optical signal, the apparatus comprising:
   an optical splitter to split the modulated optical signal into a first portion and a second portion,
   a photo detector to convert the second portion of the modulated optical signal into an electrical signal,
   a radio transceiver arranged to transmit the electrical signal without frequency conversion,
   the apparatus further arranged to receive second data and to modulate the carrier wavelength with the second data for onward transmission of the second data, wherein the inversion operation comprises applying a signal comprising an inverse of the first data to the first portion of the modulated optical signal.

2. The apparatus according to claim 1 arranged to erase the first data and modulate the carrier wavelength with the second data in a single operation.

3. The apparatus according to claim 2, further including an optical amplifier arranged to receive the modulated optical signal.

4. The apparatus according to claim 3, wherein the optical amplifier is operable to apply the signal comprising an inverse of the first data to said at least a portion of the modulated optical signal to substantially erase the first data from the optical signal.

5. The apparatus according to claim 1, wherein the signal further comprises the second data such that the modulation of the carrier wavelength and erasure of the first data is performed in a single operation.

6. The apparatus according to claim 1, wherein the signal includes a copy of the received modulated optical signal.

7. The apparatus according to claim 6, wherein the copy of the received modulated optical signal is an inverted copy of the received modulated optical signal.

8. The apparatus according to claim 6, further arranged to substantially synchronise the copy and the received modulated optical signal by delaying one of the copy and the received modulated optical signal relative to the other of the copy and the received modulated optical signal.

9. The apparatus according to claim 6, further including an optical-to-electrical convertor to receive the copy of received modulated optical signal and to convert it to an electrical signal.

10. The apparatus according to claim 1, wherein the modulated optical signal is a phase modulated optical signal.

11. A method of providing communications services, the method comprising:
   receiving a modulated optical signal modulated at a radio frequency and comprising a carrier wavelength and first data;
   splitting the modulated optical signal into a first portion and a second portion;
   converting the second portion of the modulated optical signal into an electrical signal;
   transmitting the electrical signal using a radio frequency transceiver without frequency conversion;
   substantially erasing the first data from the optical signal by performing an inversion operation on the converted second portion of the modulated optical signal;
   receiving second data; and
   modulating the carrier wavelength with the second data for onward transmission of the second data, the inversion operation comprising applying a signal comprising an inverse of the first data to the first portion of the modulated optical signal.

12. The method according to claim 11, further including performing erasing of the first data and modulation of the carrier wavelength with the second data in a single operation.

13. The method according to claim 11, further including generating the signal by combining the second data and said inverse of the first data.

14. The method according to claim 13, further including substantially synchronising the copy and the received modulated optical signal by delaying one of the copy and the received modulated optical signal relative to the other of the copy and the received modulated optical signal.

15. The method according to claim 11, wherein the signal includes a copy of the received modulated optical signal.

16. The method according to claim 15, wherein the copy of the received modulated optical signal is an inverted copy of the received modulated optical signal.

17. The method according to claim 11, wherein the modulated optical signal is a phase modulated optical signal.

18. A communications network including an apparatus arranged to receive a modulated optical signal modulated at a radio frequency and comprising a carrier wavelength and first data, the apparatus arranged to substantially erase the first data from the optical signal by performing an inversion operation on the modulated optical signal, the apparatus comprising:
   an optical splitter to split the modulated optical signal into a first portion and a second portion,
   a photo detector to convert the second portion of the modulation optical signal into an electrical signal,
   a radio transceiver arranged to transmit the electrical signal without frequency conversion,
   the apparatus further arranged to receive second data and to modulate the carrier wavelength with the second data for onward transmission of the second data, wherein the inversion operation comprises applying a signal comprising an inverse of the first data to the first portion of the modulated optical signal.

* * * * *